United States Patent Office 3,397,165
Patented Aug. 13, 1968

3,397,165
PREPARATION OF LATEX OF BUTADIENE-
CONTAINING COPOLYMERS
Donald Goodman, Brighton, Irving E. Isgur, Framingham, and Donald M. Wacome, Bedford, Mass., assignors to W. R. Grace & Co., Cambridge, Mass., a corporation of Connecticut
No Drawing. Filed May 4, 1964, Ser. No. 364,761
7 Claims. (Cl. 260—29.7)

ABSTRACT OF THE DISCLOSURE

Butadiene polymer latices of narrow particle size distribution are prepared by polymerizing monomers in the presence of a seed latex having a particle size of 50–800 angstroms. The monomers and emulsifier are added continuously during the polymerization. The continuous inflow of the emulsifier to the latex is controlled at a rate which permits the coverage of but 30–70% of the surface of the enlarging latex particle until the desired particle size is reached.

---

This invention relates to a novel process for preparing butadiene-containing polymers and more particularly to the preparation of aqueous dispersions of such polymers.

It is known that copolymer latices having a uniform particle size can be utilized more readily and efficiently in applying polymeric coatings to surfaces or in impregnating paper. It is also highly desirable to have the particles chemically uniform in composition to provide uniform properties to the polymer layer or impregnant. Reproducibility from latex to latex is also highly desirable and in some cases necessary.

The present invention is directed to a polymerization process for providing butadiene polymers which are not subject to the above-described failings and which have properties superior to butadiene polymers produced by prior art methods.

The novel process of this invention comprises charging a reaction vessel with a relatively small quantity of polymer latex as a seed to provide the nucleating sites for polymerization and adding, substantially continuously, monomers and emulsifier at a controlled rate. The rate of monomer addition is such that the added monomer becomes associated with the polymer particles essentially as soon as the monomer enters the reaction zone and a separate monomer phase is not formed. The rate of emulsifier addition is proportional to the rate of growth of particle surface area. The use of the term "associated" is intended to refer to the phenomenon of the monomer becoming a part of the polymer particle by being adsorbed or dissolved therein.

By means of the novel process of the present invention, the copolymerization of butadiene with other monomers is carried out to form aqueous copolymer dispersions of uniform particle size and surface tension. Greater reproducibility in producing latices is achieved by the process of the present invention than by prior art methods. Greater control may be exercised over the conversion of the constituent monomers in the process of the present invention; greater than 93 percent conversion of the monomers is obtained by the present invention in a relatively short period of time, e.g., 10 to 13 hours. By means of the present invention copolymers comprising butadiene and monomers containing carboxylic acid groups can be copolymerized to better than 90 percent conversion at a high pH, e.g., 4 to 5, as compared to the prior art polymerizations at a pH of about 2. Such a degree of conversion at high pH is unknown to the prior art. Carboxylated systems prepared by the novel process of the present invention also possess good mechanical stability at relatively high surface tension.

Unlike latices produced by batch-type polymerizations, the latices of the present invention contain homogeneous particles, i.e., the ratio of constituent monomers are substantially the same from particle to particle as well as being uniform in size. The latices prepared by the present invention may be characterized as chemically homogeneous as well as physically (size) homogeneous.

The novel process of the present invention requires less emulsifier than conventional processes for the polymerization of butadiene-containing polymers. The decrease in emulsifier makes the latices prepared by the present invention particularly useful, for example, as paper impregnants or for coating surfaces. The presence of emulsifier in films cast from polymer latices may be detrimental in that the presence of emulsifier may lessen water-resistance of the copolymer film or cause adhesion loss at the interface of the film and the substrate. With the use of less emulsifier the above-mentioned problems are minimized. In addition, the latices of the present invention contain more polymer per pound than prior art latices.

It should be understood that, while the latex particles of the present invention may be characterized as uniform, the particle size may vary within relatively narrow limits, for example, a latex having an average particle size of about 2000 A. may have a particle size spread of about ±200 A. from the average particle size. This should be compared with the particle size spread of latices prepared by prior art methods wherein the spread is generally 800 to 2000 A. in a latex having an average particle size of about 2000 A.

The homogeneity of the particles of the present invention is determined by centrifuging the latex and measuring the buoyant density (g./ml.) of the particles at 25° C. The particles are chemically analyzed to confirm the composition of the latex. The size of the particles is measured by electron microscopy.

In carrying out the novel process of the present invention, an aqueous dispersion of a copolymer latex is placed in a reaction vessel as a seed. The reaction vessel is then heated to the desired polymerization temperature, a polymerization initiator is added, and the monomer mixture is then added to the reaction zone at a rate such that a separate monomer phase is not formed but rather the monomers become associated with the polymer particles substantially as soon as they enter the reaction zone. Concurrent with the monomer addition, an emulsifier is added to the reaction zone at a rate proportional to the rate of growth of total particle surface area. The contents of the reactor are agitated continuously during the polymerization. After the addition of all the monomers and emulsifier, the polymerization is continued until the original particles of the seed latex have reached the desired size, generally about 2 to 9 times the size (diameter) of the original particles. In a preferred embodiment, the finished latex has particles 3 to 4 times the size of the original particles.

In the present invention, all the nucleating sites are present initially, thereby providing uniform growth and composition of the particles as the reaction proceeds, unlike a batch process wherein initiating sites of polymerization are continuously formed over a period of time as the polymerization proceeds whereby the size and composition of the particles vary according to the composition of the nucleating sites, the relative reactivity of the monomers and the time at which the nucleating sites are formed, as well as other factors.

The following nonlimiting examples illustrate the novel process of the present invention. The Mooney viscosity was determined in the following compositions according to the procedure set forth in ASTM D927–57T.

Example 1

Into a polymerization vessel were placed 6.75 parts of a 60:40 styrene:butadiene copolymer latex containing 2.7 parts of solids and having an average particle size of 600 A. To the above was added, with agitation, 0.227 part sodium pyrophosphate, 0.061 part sodium dodecyl benzene sulfonate, and 44.60 parts of water. The reactor was then purged with nitrogen for 30 minutes. The temperature of the reaction mixture was raised to 170° F., and this temperature was maintained throughout the reaction. A solution of 1.009 parts of potassium persulfate in 23.780 parts of water was then added to the reactor. The continuous addition of a mixture of 63.67 parts styrene, 33.00 parts butadiene, 3.33 parts methacrylic acid, and 0.10 part dodecyl mercaptan was begun at the rate of 16.667 parts per hour. After the monomer addition has begun, the continuous addition of a solution of 1.356 parts of sodium dodecyl benzene sulfonate and 0.663 part of sodium oleoyl isopropanol amide sulfosuccinate in 28.96 parts of water was begun. The emulsifier was added at a nonlinear rate according to the schedule set forth below.

| Elapsed reaction time (hours): | Percent of added emulsifier |
| --- | --- |
| 1 | 11.1 |
| 2 | 33.4 |
| 3 | 50.8 |
| 4 | 66.0 |
| 5 | 80.0 |
| 6 | 92.5 |
| 7 | 100.0 |

At the completion of the monomer addition, the conversion was approximately 80 percent. The reaction mixture was then maintained at 170° F. for 4 hours after the completion of the monomer addition. The maximum pressure in the reactor was 70 p.s.i.g. The reaction went to 97.2 percent conversion. The average particle size of the product was 2000 A.±200 A., the pH was about 4.5 solids, the solids 48.6 percent, and the surface tension was 45 dynes/cm.

Example 2

Using the same seed, emulsifier, and reaction conditions, a mixture of 50.00 parts butadiene, 41.67 parts styrene, 6.66 parts vinylidene chloride, and 1.67 parts methacrylic acid was polymerized as in Example 1. The maximum pressure was 110 p.s.i.g. The reaction went to 96.6 percent conversion and a total solids content of 48.3 percent. The product had an average particle size of 1950 A.±about 200 A., a Mooney viscosity of 45 MLI+4 (212° F.), and a surface tension of 52 dynes/cm.

Example 3

Using the same seed, emulsifier, and reaction conditions, a mixture of 33.33 parts butadiene, 61.67 parts styrene, 3.33 parts vinylidene chloride, and 1.67 parts methacrylic acid was polymerized as in Example 1. The maximum pressure was 70 p.s.i.g. The reaction went to 97.2 percent conversion and a total solids content of a 60:40 parts of solids and having an average particle size 2000 A.±200 A., a surface tension of 50 dynes/cm., and a Mooney viscosity of 76 MLI+4 (212° F.).

Example 4

Into a polymerization vessel were placed 4.00 parts of a 60.40 styrene:butadiene copolymer latex containing 1.52 parts of solids and having an average particle size of 600 A. To the above was added 0.227 part sodium pyrophosphate, 0.034 part dodecyl benzene sulfonate, and 55.00 parts of water. The reactor was then purged with nitrogen for 30 minutes. The temperature of the reaction mixture was raised to 160° F., and this temperature was maintained throughout the reaction. A solution of 0.750 part of potassium persulfate in 24.250 parts of water was then added to the reactor. The continuous addition of 90.00 parts of styrene and 10.00 parts of butadiene was begun at a rate of 20.00 parts per hour. After the monomer addition was begun, the continuous addition of a solution of 1.800 parts of sodium dodecyl benzene sulfonate in 52.0 parts of water was begun. The emulsifier was added at a nonlinear rate according to the schedule set forth below.

| Elapsed reaction time (hours): | Percent of added emulsifier |
| --- | --- |
| 1 | 15.9 |
| 2 | 46.0 |
| 3 | 69.0 |
| 4 | 88.2 |
| 5 | 100.0 |

The reaction mixture was maintained at 160° F. for 3 hours after the completion of monomer addition. The maximum pressure was 12 p.s.i.g. The reaction went to 95.1 percent conversion, the pH of the latex was 6.8, the product particle size was 2400 A.±200 A., the surface tension was 44 dynes/cm., and the total solids content was 47.6 percent.

Example 5

A mixture of 6.75 parts of a 60:40 styrene:butadiene copolymer latex containing 2.7 parts of solids and having an average particle size of 600 A. was placed in a reactor. To the above was added 0.13 parts of sodium hydroxide in 46.66 parts of water to provide the desired pH (10.0). The reactor was then purged of air by evacuation, and the contents of the reactor raised to 150° F. and maintained at this temperature throughout the reaction. A solution of 0.75 part of potassium persulfate in 17.79 parts of water was then added to the reactor. The continuous addition was then begun at the rate of 16.748 parts/hr. of a mixture of 31.500 parts acrylonitrile, 66.400 parts butadiene, 2.100 parts glacial acrylic acid, and 0.488 part tert.-dodecyl mercaptan. After the addition of the monomers was begun, a solution of 1.77 parts of sodium dodecyl benzene sulfonate in 58.45 parts of water was begun at a nonlinear rate as a function of particle area growth. The addition was continued for a period of 7 hours according to the rate set forth in Example 1. After all the monomers had been added, the contents of the reactor were maintained at 150° F. for 4 hours. The maximum pressure was 100 p.s.i.g. The reaction went to 97.8 percent conversion and a total solids content of 48.9. The product had an average particle size of 2000 A.±200 A., a surface tension of 40 dynes/cm., a Mooney viscosity of 65 MLI+4 (212° F.), and a pH of about 4.

Example 6

A monomer mixture of 60.0 parts styrene, 40.0 parts butadiene, and 3.0 parts para-menthane hydroperoxide was polymerized in accordance with the following procedure. 15.0 parts of a 60:40 styrene:butadiene copolymer latex containing 5.3 parts of solids and having an average particle size of 600 A. were placed in a reaction vessel as the seed. To the seed latex in the reactor was added 0.40 part of sodium sulfoxylate formaldehyde, 0.50 part of sodium pyrophosphate, and 0.088 part of sodium dioctyl sulfosuccinate in 120 parts of water with agitation. After purging the reactor as in Example 1, the reaction mixture was heated to 130° F., and this temperature maintained throughout the reaction. When the reaction temperature of 130° F. was attained, a solution of 0.04 part ferrous sulfate in one (1) part of water was added to the reactor, and the monomer addition begun. After the monomer addition was begun, the continuous addition of a solution of 0.85 part of sodium dioctyl sulfosuccinate in 10 parts of water was begun. The emulsifier was added at a nonlinear rate according to the schedule set forth below.

| Elapsed reaction time (hours): | Percent of added emulsifier |
|---|---|
| 1 | 8.5 |
| 2 | 28.2 |
| 3 | 43.5 |
| 4 | 57.5 |
| 5 | 70.4 |
| 6 | 81.2 |
| 7 | 92.0 |
| 8 | 100.0 |

The monomer mixture was added at a rate of 14.714 parts per hour. The reaction mixture was maintained at 130° F. for 4 hours after the completion of monomer addition. The maximum pressure was 55 p.s.i.g. The reaction went to 93.9 percent conversion, and the solids content was 46.9 percent. The product had an average particle size of 1600 A.

Example 7

Sodium pyrophosphate, 0.154 part, sodium lauroyl sarcosinate, 1.044 parts, and water, 235 parts, was charged to a polymerization vessel. The reactor was purged with nitrogen for 30 minutes, agitation begun, and the temperature raised to 160° F. This temperature was maintained throughout the reaction. When the temperature reached 160° F., a solution of 1.138 parts potassium persulfate in 25 parts of water was added to the reactor. The continuous addition of a mixture of 36 parts styrene and 24 parts butadiene was begun immediately at a rate of 20 parts/hr. After the monomer addition was begun, the continuous addition of a solution of 3.33 parts sodium lauroyl sarcosinate in 10.00 parts water was begun and continued for 4 hours at a nonlinear rate according to the schedule set forth below.

| Elapsed reaction time (hours): | Percent of added emulsifier |
|---|---|
| 1 | 22.8 |
| 2 | 57.7 |
| 3 | 84.2 |
| 4 | 100.0 |

After 3 hours a sample was taken, and the latex was characterized as having an average particle size of 200 A. The continuous addition of a mixture of 60 parts styrene and 40 parts butadiene was begun and continued at a rate of 20 parts/hr. After the start of monomer addition, the continuous addition of 3.07 parts of sodium lauroyl sarcosinate in 10 parts of water was begun and continued for 5 hours at a nonlinear rate according to the schedule set forth below.

| Elapsed reaction time (hours): | Percent of added emulsifier |
|---|---|
| 1 | 13.6 |
| 2 | 39.0 |
| 3 | 58.4 |
| 4 | 75.2 |
| 5 | 90.6 |
| 6 | 100.0 |

The reaction mixture was maintained at 160° F. for 2 hours after the completion of monomer addition. The maximum pressure was about 55 p.s.i.g. The reaction went to 98.9 percent conversion. The product particle size was 800 A., and the total solids content 39.5 percent.

It is not necessary that the seed latex be of the same composition as the copolymer that is being prepared so long as the monomers are soluble in the seed. Preferably, the seed latex is about 40 percent total solids, but this may be varied over a wide range. Since the particle size is generally relatively small, however, a high solids content would result in a seed latex of relatively high viscosity with its attendant mixing and heat transfer problems. Therefore, a seed latex of relatively low solids content is preferred.

The particle size of the seed latex is generally selected on the basis of the desired particle size of the finished copolymer. As long as the particle size of the seed latex is smaller than the desired particle size of the copolymer to be prepared, the novel process of the present invention may be used. Preferably, the particle size of the seed latex must be greater than the micelle size (about 50 A.) to ensure that growth will occur on the seed latex particles and not the emulsifying agent. The average particle size of the seed latex is preferably about 400 to 800 A. and more preferably about 600 A.

It should be understood that in addition to using a previously prepared latex as a seed, the seed may also be formed in situ in the reaction vessel, and the entire process may be carried out on a substantially continuous basis. For example, a small amount of copolymer latex may be prepared in a reactor by conventional means, and the thus-formed latex may then be used as the seed for carrying out the process of the present invention. While the seed formed in situ may vary in particle size ±50 percent, the actual particle size spread of the particles of the finished latex would still be only about ±200 A. Example 7 illustrates the in situ preparation of the seed latex.

The novel process of the present invention has been carried out using a variety of seed sizes and concentrations to provide latices having a wide range of particle sizes. The following table illustrates examples of the varying seed sizes and concentrations utilized in practicing the present invention and particle size of the finished product.

| Seed Size—Average particle diameter, A. | Seed Concentration—parts of polymer/100 parts of monomer | Product—Average particle diameter, A. |
|---|---|---|
| 600 | 2.58 | 2,050 |
| 600 | 4.90 | 1,650 |
| 600 | 3.73 | 1,800 |
| 600 | 3.33 | 1,865 |
| 625 | 2.65 | 2,100 |
| 555 | 2.12 | 2,100 |
| 500 | 1.50 | 2,100 |
| 425 | 1.00 | 2,100 |
| 610 | 2.50 | 2,070 |
| 538 | 1.78 | 2,025 |
| 537 | 1.92 | 2,010 |
| 540 | 75.00 | 605 |
| 2,100 | 35.00 | 3,500 |

In the above table the deviation in particle size from the average is a maximum of ±200 A. with the exception of the latex which has the 605 A. particle size.

The quantity of seed latex initially charged to the reactor is dependent on its average particle size, the desired product particle size, and the quantity of monomers to be polymerized, and may be represented by the following equation:

$$W_s = \frac{M}{\left(\dfrac{\rho_p}{\rho_s}\right)\left(\dfrac{D_p}{D_s}\right)^3 - 1}$$

wherein:

$W_s$ = weight of seed polymer
$M$ = weight of monomers
$\rho_p$ and $\rho_s$ = density of product polymer and seed polymer respectively
$D_p$ and $D_s$ = diameter of particles of the product polymer and seed polymer respectively It may be readily seen, therefore, that the polymer in the seed latex may range from 0.5 percent by weight of the monomers to about 98 percent by weight of the monomers.

Preferably, the seed latex comprises 2 to 10 percent by weight of the finished copolymer, more preferably 3 percent.

An emulsified to provide stability to the seed latex may also be added to the reactor along with the seed latex. The amount of emulsifier must be insufficient to provide new nucleating sites. The emulsifier added with the seed and the emulsifier added during the polymerization together must be less than that required for the production of nucleating sites. It may also be desirable to add a buffer to the reactor with the seed latex when acid-forming initiators are used. However, the use of the emulsifier or the buffer with the seed latex is not necessary to the invention.

The reaction temperatures in general are the temperatures normally utilized in prior art butadiene polymerizations. The minimum temperature is dependent upon the rate of decomposition of the particular initiator. The maximum temperature is about the boiling point of water, 212° F. The pressures are those normally used for butadiene polymerizations, i.e., 30 to 120 p.s.i.g. There is considerable leeway in the selection of the particular reaction temperature and pressure. It should be noted that the selection of the temperature is not limited by the effect of temperature on micelles since polymerization in the process of this invention is not dependent upon micelle formation. Preferably, temperatures in the range of 140° to 180° F. are used.

The water to provide the aqueous dispersion of the finished copolymer may be added to the reaction zone at almost any stage of the polymerization, even continuously throughout the entire reaction period provided that there is sufficient water present in the reactor at any time to prevent coagulation of the copolymer. The rate and time of addition of the water is governed only by the necessity to have sufficient water present to prevent the coagulation of the copolymer as it is being formed.

The rate of addition of the monomers is determined by the association by solubility or adsorption of the added monomers in the polymer, i.e., a separate monomer phase should not be formed. The rate of addition of the monomers in practice may also be governed by the ability of the reactor to remove heat from the exothermic reaction and maintain the desired reaction temperature.

Initiators known to the art for use in butadiene copolymer polymerization may be used in the present invention.

As examples of suitable initiator systems, mention may be made of the following:

Potassium persulfate
Ammonium persulfate
p-Menthane hydroperoxide/sodium sulfoxylate formaldehyde/ferrous sulfate
Cumene hydroperoxide/sodium sulfoxylate formaldehyde/ferrous sulfate
p-Menthane hydroperoxide/sodium bisulfate/ferrous sulfate
Potassium persulfate/sodium bisulfite/ferrous sulfate
Potassium persulfate/sodium bisulfite
$\alpha,\alpha'$-Azobisisobutyronitrile
Hydrogen peroxide/dextrose/ferrous sulfate As stated above, the emulsifier is added to the reactor to provide stability to the thus-formed latex, not to provide nucleating sites for polymerization. Only the minimum amount of emulsifier to provide stability is necessary.

The total amount of emulsifier required in the polymerization ($E_2$) is dependent upon the average particle size of the product polymer and is calculated in the following manner:

$$E_2 = E_1 \times \frac{V_2}{V_1} \times \frac{D_1}{D_2}$$

wherein $E_1$=known weight of emulsifier that is sufficient to give a stable product but insufficient to form micelles,
$V_1$=volume of product polymer containing emulsifier concentration $E_1$,
$V_2$=volume of product polymer to be formed,
$D_1$= diameter of product polymer containing emulsifier concentration $E_1$,
$D_2$=diameter of product polymer to be formed.

A portion of the total emulsifier calculated above may be added to the reactor at the start of the reaction with the seed latex and a second portion is added continuously at a rate calculated to stabilize the growing polymer particle without forming micelles. This rate is calculated from the following equation:

$$\frac{dE}{dt} = KC(MC+S)^{-1/3}\frac{dM}{dt}$$

wherein $E$=weight of emulsifier added at time $t$
$M$=weight of monomers added at time $t$
$C=\rho_{mfc}+\rho_p(1-fc)/\rho_p\rho_m$
$\rho_s, \rho_m, \rho_p$=density of seed polymer, monomer, and product polymer respectively (dry basis)
$fc$=fractional conversion at time $t$
$S=W_s/\rho_s$ By integrating the above equation, the weight of emulsifier required in the initial charge can be calculated.

Alternatively, all the emulsifier is added continuously after the monomer addition is begun, and no initial charge of emulsifier is added.

The emulsifier is added at a rate such that only about 30 to 70 percent of the surface area of the particle is covered with emulsifier. Preferably, the emulsifier is added at such a rate that about 50 percent of the particle surface area is covered. If the rate of addition of emulsifier is such that less than about 30 percent of the surface area is covered, then coagulation of the polymer may occur; if above 70 percent of the surface area is covered, then emulsifier will be available to form loci of polymerization.

The emulsified may be anionic, mixtures of anionic emuisifiers, or mixtures of anionic and nonionic emulsifiers.

As examples of emulsifiers suitable for use in the present invention, mention may be made of the following:

Sodium lauroyl sarcosinate
Disproportioned rosin acid salt
Sodium dodecyl benzene sulfonate
Ammonium nonyl phenol polyglycol ether sulfate
Salt of polyethyleneoxy phosphate ester
Potassium oleate
Sodium dioctyl sulfosuccinate
Sodium dodecyldiphenyl oxide disulfonate
Sodium oleoyl isopropanolamide sulfosuccinate
Sodium lauryl sulfate Preferably, the reaction is carried out to completion, which is generally above 95 percent conversion. If desired, the reaction may be stopped at any point to obtain as a product a latex having particles of any incremental size above the size of the seed particles at any desired solids content or degree of conversion. Preferably, the reaction is carried out to a 35-fold increase in volume of the seed latex particles. In a preferred embodiment the solids content of the finished latex is 45 to 55 percent.

A wide variety of copolymers may be prepared by the novel process of the present invention. For example, styrene/butadiene, styrene/butadiene/acrylonitrile, styrene/butadiene/acrylic acid, styrene/butadiene/methacrylic acid, styrene/butadiene/acrylonitrile, styrene/butadiene / butylacrylate, styrene/butadiene/butylacrylate/ acrylic acid, styrene/butadiene/butylacrylate/methacrylic acid, butadiene / acrylonitrile, butadiene/acrylonitrile/ acrylic acid, and butadiene/acrylonitrile/methacrylic acid.

The butadiene content of the finished product may comprise about 10 to 98 weight percent of the constituent monomers. It should also be understood that latices substantially all polybutadiene may be prepared by the process of the present invention. It should also be understood that the term butadiene as used herein is intended to include conjugated dienes in general such as isoprene and 2,3-dimethyl-1,3-butadiene.

Preferred copolymer latices prepared by the present invention include a 69:2:1.6:27.4 butadiene/acrylonitrile/styrene/acrylic acid copolymer, a 50:31.8:6.6:1.6 butadiene/styrene/vinylidene chloride/methacrylic acid copolymer, and a 33.3:61.6:3.3:1.6 butadiene/styrene/vinylidene chloride/methacrylic acid copolymer.

The term micelle as used herein is intended to refer to the aggregation of emulsifier molecules which provide loci of polymerization.

What is claimed is:

1. The process of producing, by grafting, a finished latex which possesses a high degree of uniformity in particle size, surface tension, and chemical composition which includes: charging a polymerizing vessel with an initial seed having a particle size lying between 50 and 800 angstroms, and consisting of a polymer in which all of the subsequently grafted monomers are soluble, preparing a monomeric mixture of a conjugated diene and monomers selected from the class consisting of styrene, acrylonitrile, acrylic acid, methacrylic acid, and butyl acrylate, and wherein the monomeric proportion of the conjugated diene is at least 10%, establishing polymerizing conditions in the vessel and thereafter continuously admitting the monomeric mixture into the reaction zone at a flow rate insufficient to permit the formation in said zone of a separate monomer phase, simultaneously with the addition of said monomer mixture continuously adding an emulsifier to the reaction zone but only at such a rate as will permit the coverage of from but 30 to 70% of the surface area of the polymer particles, continuing the uninterrupted flow of said monomeric mixture and emulsifier into the reaction zone while maintaining polymerizing conditions in the reaction zone until the diameter of the polymer particles has increased to a previously selected size, and subsequently recovering a latex having the said characteristics of uniformity.

2. The process of claim 1 wherein graft polymerizing conditions and the input of said monomeric mixture and said emulsifier in the reaction zone is maintained for a time sufficient to increase the diameter of said seed particles to a selected size lying between 2 and 9 times the original diameter of the seed.

3. A process as defined in claim 1 wherein said initial polymer latex particles have an average size of 400 to 800 A. and said emulsifier is added at a rate sufficient to cover about 50 percent of the polymer particle surface area.

4. A process as defined in claim 1 wherein said monomer material contains a carboxylated monomer which is copolymerizable with butadiene.

5. A process as defined in claim 1 wherein said monomer material comprises styrene, butadiene, and methacrylic acid.

6. A process as defined in claim 1 wherein said monomer material comprises butadiene, acrylonitrile, and acrylic acid.

7. An improved latex prepared by the process of claim 1.

References Cited
UNITED STATES PATENTS

| | | | |
|---|---|---|---|
| 3,324,066 | 6/1967 | Archangeli et al. | 260—29.7 |
| 3,238,275 | 3/1966 | Calvert | 260—880 |
| 3,288,887 | 1/1966 | Yoshino et al. | 260—29.7 |
| 2,711,400 | 6/1955 | Harrison et al. | 260—879 |
| 2,939,852 | 6/1960 | Schmidle | 260—29.7 |
| 3,119,786 | 1/1964 | Christer et al. | 260—87.9 |
| 3,170,064 | 2/1965 | Grabouski | 260—880 |
| 3,282,867 | 11/1966 | Stahly et al. | 260—29.7 |

FOREIGN PATENTS

| | | |
|---|---|---|
| 867,481 | 5/1961 | Great Britain. |

MURRAY TILLMAN, *Primary Examiner.*

J. T. GOOLKASIAN, *Assistant Examiner.*